(12) United States Patent
Cabillic et al.

(10) Patent No.: US 8,291,435 B2
(45) Date of Patent: Oct. 16, 2012

(54) JEK CLASS LOADER NOTIFICATION

(75) Inventors: Gilbert Cabillic, Brece (FR);
Jean-Philippe Lesot, Argentre du Plessis (FR)

(73) Assignee: Texas Instruments Incorporated, Dallas, TX (US)

(*) Notice: Subject to any disclaimer, the term of this patent is extended or adjusted under 35 U.S.C. 154(b) by 1245 days.

(21) Appl. No.: 11/954,658

(22) Filed: Dec. 12, 2007

(65) Prior Publication Data
US 2009/0089807 A1    Apr. 2, 2009

(30) Foreign Application Priority Data
Sep. 28, 2007  (EP) ................... 07291169

(51) Int. Cl.
*G06F 3/00*  (2006.01)
(52) U.S. Cl. ................... 719/318

(58) Field of Classification Search ............ None
See application file for complete search history.

(56) References Cited

U.S. PATENT DOCUMENTS

| | | | |
|---|---|---|---|
| 6,543,011 B1* | 4/2003 | Schumacher et al. | 714/45 |
| 6,868,543 B1* | 3/2005 | Nusbickel | 719/318 |
| 2002/0049719 A1* | 4/2002 | Shiomi et al. | 707/1 |
| 2004/0015936 A1* | 1/2004 | Susarla et al. | 717/166 |
| 2005/0097567 A1* | 5/2005 | Monnie et al. | 719/315 |
| 2006/0095919 A1* | 5/2006 | Shiomi et al. | 718/104 |

* cited by examiner

*Primary Examiner* — S. Sough
*Assistant Examiner* — Carina Yun
(74) *Attorney, Agent, or Firm* — Ronald O. Neerings; Wade James Brady, III; Frederick J. Telecky, Jr.

(57) ABSTRACT

A method and system for performing class loader notification. At least some of the illustrative embodiments are methods comprising raising a notification during execution of a first method (the notification based on an event), identifying the first method, and invoking a second method based on the identification of the first method in response to the notification.

18 Claims, 6 Drawing Sheets

JEK CLASS LOADER NOTIFICATION

CROSS-REFERENCE TO RELATED APPLICATION

The present application claims priority to EP Application No. 07291169.6, filed on Sep. 28, 2007, hereby incorporated herein by reference.

BACKGROUND

Java™ is a programming language that, at the source code level, is similar to object oriented programming languages such as C++. Java™ language source code is compiled into an intermediate representation based on a plurality "bytecodes" that define specific actions. In some implementations, the bytecodes are further compiled to machine language for a particular processor. In order to speed the execution of Java™ language programs, some processors are specifically designed to execute some of the Java™ bytecodes directly.

Many times, a processor that directly executes Java™ bytecodes is paired with a general purpose processor so as to accelerate Java™ program execution in a general or special purpose machine. It would be advantageous to provide accelerations, similar to those seen for directly executed Java™ bytecodes, in other languages and development environments.

In addition to using Java™ bytecodes to define specific actions, the triggering of such actions is sometimes driven by the occurrence of specific events. An event is generated by an event source which is a Java™ object and which often corresponds to a user interface component such as a mouse, keyboard, or other user interface device. The event serves as a way to notify a listener program that something of interest has occurred such as typing of a key on a keyboard, clicking of a mouse button, or any other such event. When an event occurs, a notification may be raised, and a particular Java™ method may be triggered for execution. It would be desirable to define a methodology that would allow identification and execution of the proper Java™ method in response to the raised notification.

SUMMARY

The problems noted above are solved in large part by a method and system for performing class loader notification. At least some of the illustrative embodiments are methods comprising raising a notification during execution of a first method (the notification based on an event), identifying the first method, and invoking a second method based on the identification of the first method in response to the notification.

Other illustrative embodiments are computer systems comprising a processor that executes bytecodes, and a memory coupled to the processor. The processor raises a notification during execution of a first method (the notification based on an event that has an identification value). The processor identifies a class loader from among a plurality of class loaders (wherein the class loader loaded the first method). The processor executes a second method, wherein the class loader is used to select the second method based on the identification value.

Yet other illustrative embodiments are computer-readable mediums storing a program that, when executed by a processor of a host system, causes the processor to raise a notification during execution of a first method (the notification based on an event that has an identification value), identify the first method, and execute a second method in response to the notification, wherein a class loader is used to identify the second method based on the identification value.

BRIEF DESCRIPTION OF THE DRAWINGS

For a more detailed description of the various embodiments, reference will now be made to the accompanying drawings, wherein.

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

The subject matter disclosed herein is directed to a programmable electronic device, such as a processor. The processor described herein may be particularly suited for executing Java™ Bytecodes, or comparable code. Java™ is particularly suited for embedded applications and is a relatively "dense" language meaning that, on average, each instruction may perform a large number of functions compared to various other programming languages. The dense nature of Java™ is of particular benefit for portable, batteryoperated devices. The reason, however, for executing Java™ code is not material to this disclosure or the claims that follow. Further, the various embodiments may be described in the context of Java™, but should not be limited to the execution of only Java™ instructions. The processor described herein may be used in a wide variety of electronic systems (e.g., cell phones).

Figure 1:
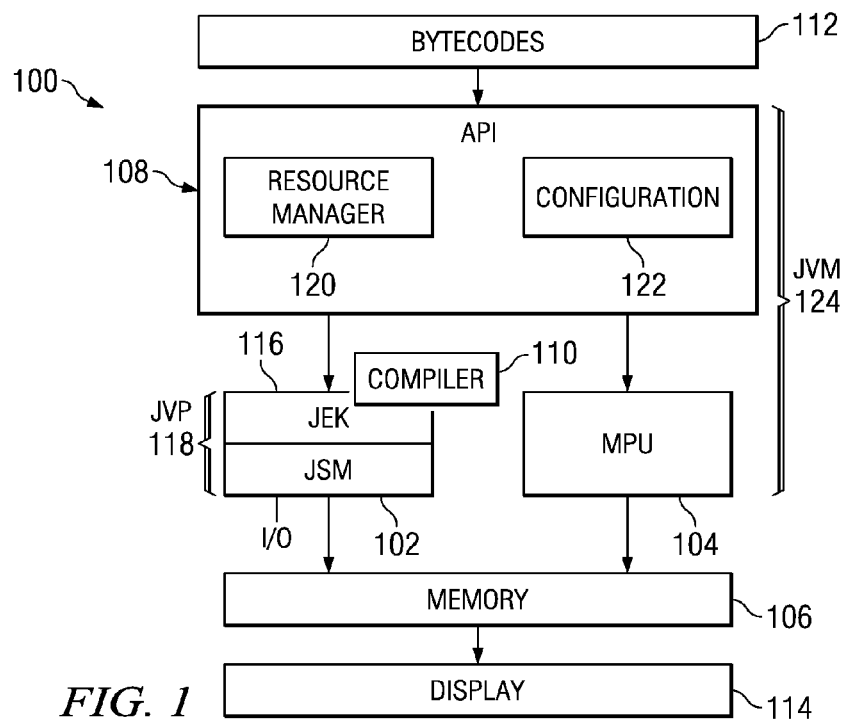
FIG. 1 illustrates a diagram of a system in accordance with embodiments of the invention comprising a Java Stack Machine ("JSM")

FIG. 1 illustrates a system 100 in accordance with at least some embodiments. In particular, the system 100 comprises at least one processor 102. Processor 102 is referred to for purposes of this disclosure as a Java Stack Machine ("JSM") 102. The JSM 102 comprises an interface to one or more input/output ("I/O") devices such as a keypad to permit a user to control various aspects of the system 100. In addition, data streams may be received from the I/O space into the JSM 102 to be processed by the JSM 102.

Optional processor 104 may be referred to as a Micro-Processor Unit ("MPU"). System 100 may also comprise memory 106 coupled to both the JSM 102 and MPU 104 and thus accessible by both processors. A portion of the memory 106 may be shared by both processors, and if desired, other portions of the memory 106 may be designated as private to one processor or the other. The memory 106 may be further coupled to a display 114.

System 100 also comprises a Java virtual machine (JVM) 124. The JVM 124 may comprise an Application Programming Interface implementation (API) 108 and a Java Virtual Processor (JVP) 118 (discussed more below). The API implementation 108 comprises a resource manager 120 and a configuration 122. The resource manager 120 manages resource sharing between multiple threads and/or applications running on the system 100. The configuration 122 provides applications with an API, which API is used to access base functionalities of the system.

The JVP 118 may comprise a combination of software and hardware. The software may comprise a compiler 110 and a JSM Execution Kernel (JEK) 116. The JEK 116 comprises software that is executable within the JSM 102, such as a class loader, bytecode verifier, garbage collector, and firmware to interpret the bytecodes that are not directly executed on the JSM processor 102. Thus, the hardware of the JVP 118 may comprise the JSM 102. The JVP 118 provides a layer of abstraction between the API 108 and a physical hardware platform (e.g., JSM 102) that executes Java bytecodes. Other components may be present as well.

Java language source code is converted or compiled to a series of bytecodes 112, with each individual one of the bytecodes referred to as an "opcode." Bytecodes 112 may be provided to the JEK 116, possibly compiled by compiler 110, and provided to the JSM 102. When appropriate, the JVP 118 may direct some method execution to the MPU 104.

The MPU 104 also may execute non-Java instructions. For example, the MPU 104 may host an operating system (O/S) which performs various functions such as system memory management, system task management and most or all other native tasks running on the system, management of the display 114, and receiving input from input devices. Java code, executed on the JVP 118, may be used to perform any one of a variety of applications such as multimedia, games or web based applications in the system 100, while non-Java code, which may comprise the O/S and other native applications, may run on the MPU 104.

Most Java™ bytecodes perform stack-based operations. For example, an "IADD" (integer add) Java™ opcode pops two integers off the top of the stack, adds them together, and pushes the sum back on the stack. A "simple" opcode is one in which the JSM 102 may perform an immediate operation either in a single cycle (e.g., an IADD opcode) or in several cycles (e.g., "DUP2_X2"). A "complex" opcode is one in which several memory accesses within the JVM or JEK data structure for various verifications (e.g., NULL pointer, array boundaries) are made.

The JSM processor 102 in accordance with some embodiments may execute, in addition to the Java™ bytecodes, a second instruction set other than Java™ bytecodes. In some exemplary embodiments, the second instruction set may comprise register-based and memory-based operations rather than stack based operations. This second instruction set complements the Java™ instruction set and, accordingly, may be referred to as a complementary instruction set architecture ("C-ISA"). By complementary, it is meant that some complex Java™ bytecodes may be replaced by a "micro-sequence" comprising C-ISA instructions. The execution of Java™ code may thus be made more efficient and run faster by replacing some opcodes by more efficient micro-sequences of C-ISA instructions. The JSM 102 thus comprises a stack-based architecture for direct execution of Java™ bytecodes, combined with a register-based architecture for direct execution of memory based micro-sequences of C-ISA instructions. Because various data structures may be JVM dependent, and thus may change from one JVM implementation to another, the software flexibility of the micro sequence provides a mechanism for various JVM optimizations now known or later developed.

As discussed above, the JVP 118 provides a layer of abstraction. In particular, the JVP 118 is a virtual hardware platform that is compatible with any Java API, any real hardware/software platform that may comprise a JSM processor, or any JVM implementation. In some exemplary embodiments, the JVP 118 comprises a JEK core that has an execution engine, a memory management component, and a compiler. The execution engine may comprise a Bytecode engine, a class loader, a notification manager, and an external method interface. The memory management component may comprise a memory allocator, an object mapper for physically constrained objects, a garbage collector, a memory defragmentor, and a swapper. The compiler may comprise a dynamic compiler and provide code buffer management. The JEK core may also comprise firmware to facilitate the execution of Java Bytecodes on the JSM processor.

The JVP 118 also provides the API 108 with methods to create software class loaders. A class loader loads classes used by an application at runtime. Other hardware components of the hardware platform or software components are virtualized within the JEK 116 as Java Virtual Devices (JVD) that communicate with the JEK core. Each JVD comprises some combination of fields, methods, and notifications. The fields may comprise standard Java fields or may be mapped to a predefined or constrained physical memory space, wherein the constraint may be due to hardware or software. The fields may also comprise a map to indirect memories. The methods may comprise standard bytecodes or may comprises JSM native code, hardware instructions, or may use any kind of native interface such as a Java Native Interface (JNI) or a KVM Native Interface (KNI). The notifications may be initiated by an event, for example, a hardware interrupt, or from software. Additionally, the JEK core manages native interface links and the notification mechanism provides a way to implement flexible monitoring.

Figure 2:
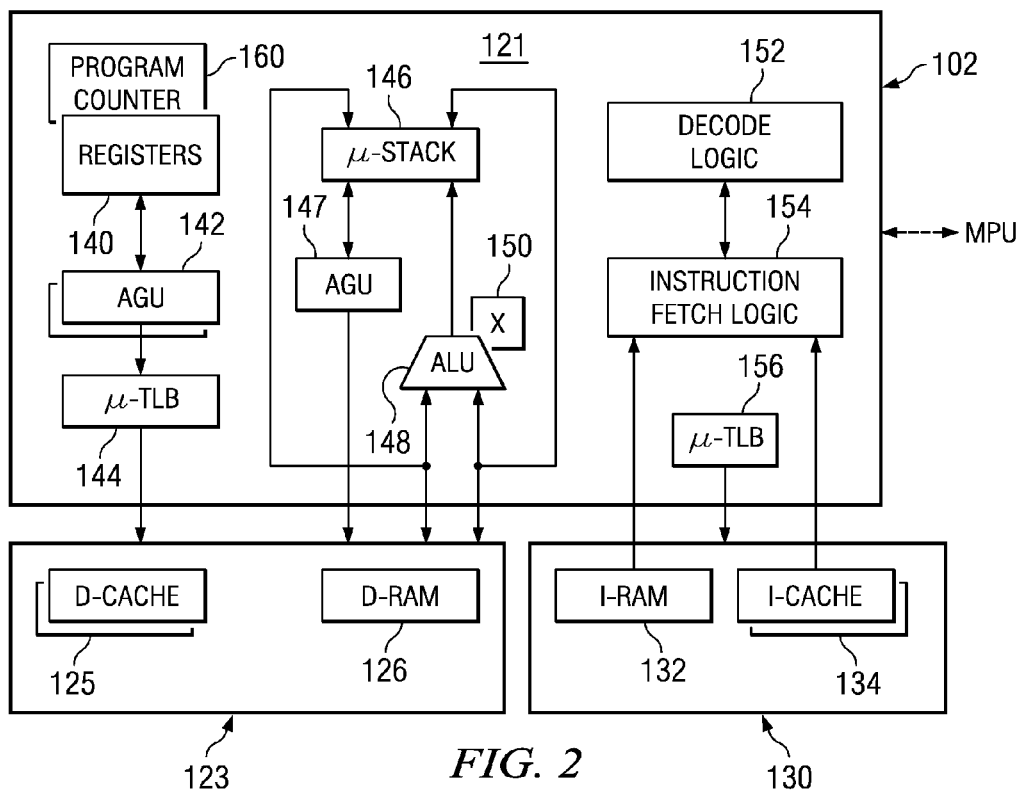
FIG. 2 illustrates a block diagram of the JSM of FIG. 1.

FIG. 2 shows an illustrative block diagram of the JSM 102 that executes the JEK 116 software, as described above. As shown, the JSM comprises a core 121 coupled to data storage 123 and instruction storage 130. The components of the core 121 may comprise a plurality of registers 140 such as a program counter 160, address generation units ("AGUs") 142 and 147, micro translation lookaside buffers (micro TLBs) 144 and 156, a multi entry micro stack 146, an arithmetic logic unit ("ALU") 148, a multiplier 150, decode logic 152, and instruction fetch logic 154. Data pointed to by operands of opcodes may be retrieved from data storage 123, from the micro stack 146, or from the registers 140 and processed by the ALU 148. Instructions pointed to by the program counter 160 may be fetched from instruction storage 130 by fetch logic 154 and decoded by decode logic 152. The AGUs 142 may be used to calculate addresses based, at least in part, on data contained in the registers 140. AGU 147 couples to the micro stack 146 and may manage overflow and underflow conditions in the micro stack 146. The micro-TLBs 144 and 156 perform the function of a cache for the address translation and memory protection information bits that may be under the control of the operating system running on the MPU 104.

Java™ bytecodes may pop data from and push data onto the micro-stack 146, which micro-stack 146 comprises a plurality of gates in the core 121 of the JSM 102. The micro-stack 146 comprises the top x entries of a larger stack that is implemented in data storage 123. Although the value of x may be vary in different embodiments, in accordance with at least some embodiments the size x of the micro-stack may be the top eight entries in the larger, memory-based stack. By implementing the micro-stack 146 hardware in the core 121 of the processor 102, access to the data contained in the micro-stack 146 is very fast, although any particular access speed is not a limitation on this disclosure.

ALU 148 adds, subtracts, and shifts data. The multiplier 150 may be used to multiply two values together in one or more cycles. The instruction fetch logic 154 fetches instructions from instruction storage 130, which instructions may be decoded by decode logic 152. Because the JSM 102 is configured to process instructions from at least two instruction sets, the decode logic 152 comprises at least two modes of operation, one mode for each instruction set. As such, the decode logic unit 152 may comprise a Java™ mode in which Java™ bytecodes may be decoded, and a C-ISA mode in which micro-sequences of C-ISA instructions may be decoded.

The data storage 123 comprises data cache ("D-cache") 125 and data random access memory ("D-RAM") 126. The stack (excluding the micro stack 146), arrays and non-critical data may be stored in the D-cache 125, while local variables and data may be stored in D-RAM 126. The instruction storage 130 may comprise instruction RAM ("I-RAM") 132 and instruction cache ("I-Cache") 134. The I-RAM 132 may be used for opcodes or micro-sequences, and the I-Cache 134 may be used to store other types of Java™ bytecode and mixed Java™/C-ISA instructions.

Figure 3:
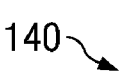
FIG. 3 illustrates various registers used in the JSM of FIGS. 1 and 2.

Referring now to FIG. 3, the registers 140 (of FIG. 2) may comprise a plurality of registers designated as R0-R15. Registers R0-R3, R5, R8-R11 and R13-R14 may be used as general purposes ("GP") registers for any purpose. Other registers, and some of the GP registers, may be used for specific purposes. For example, registers R4 and R12 may each be used to store program counters, with R4 storing a program counter ("PC") for a stream of bytecodes, and R12 storing a micro-program counter ("micro-PC") for executing micro sequences. In addition to use as a GP register, register R5 may be used to store the base address of a portion of memory in which Java™ local variables may be stored when used by a Java™ method. The top of the micro stack 146 can be referenced by the values in registers R6 and R7, and the top of the micro stack may have a matching address in external memory pointed to by register R6. The values contained in the micro-stack are the latest updated values, while their corresponding values in external memory may or may not be up to date. Register R7 provides the data value stored at the top of the micro stack. Registers R8 and R9 may also be used to hold the address index 0 ("AI0") and address index 1 ("AI1"). Register R14 may also be used to hold the indirect register index ("IRI"). Register R15 may be used for status and control of the JSM 102. At least one bit (called the "Micro-Sequence-Active" bit, not specifically shown) in status register R15 is used to indicate whether the JSM 102 is executing by way of a micro sequence. This bit controls, in particular, which program counter is used (R4 (PC) or R12 (micro PC)) to fetch the next instruction.

As discussed above, the JEK 116 is capable of raising Java notifications based on an event. An event is generated by an event source (discussed below) which is a Java object and which often corresponds to a component such as the JVP 118 itself, a mouse, keyboard, or other device. The event serves as a way to notify a registered listener program (discussed below) that an event of interest has occurred, such as typing of a key on a keyboard, clicking of a mouse button, or any other such event. When an event occurs, a notification is raised, and in accordance with some exemplary embodiments, a particular Java method is triggered for execution in response to the notification.

Figure 4:
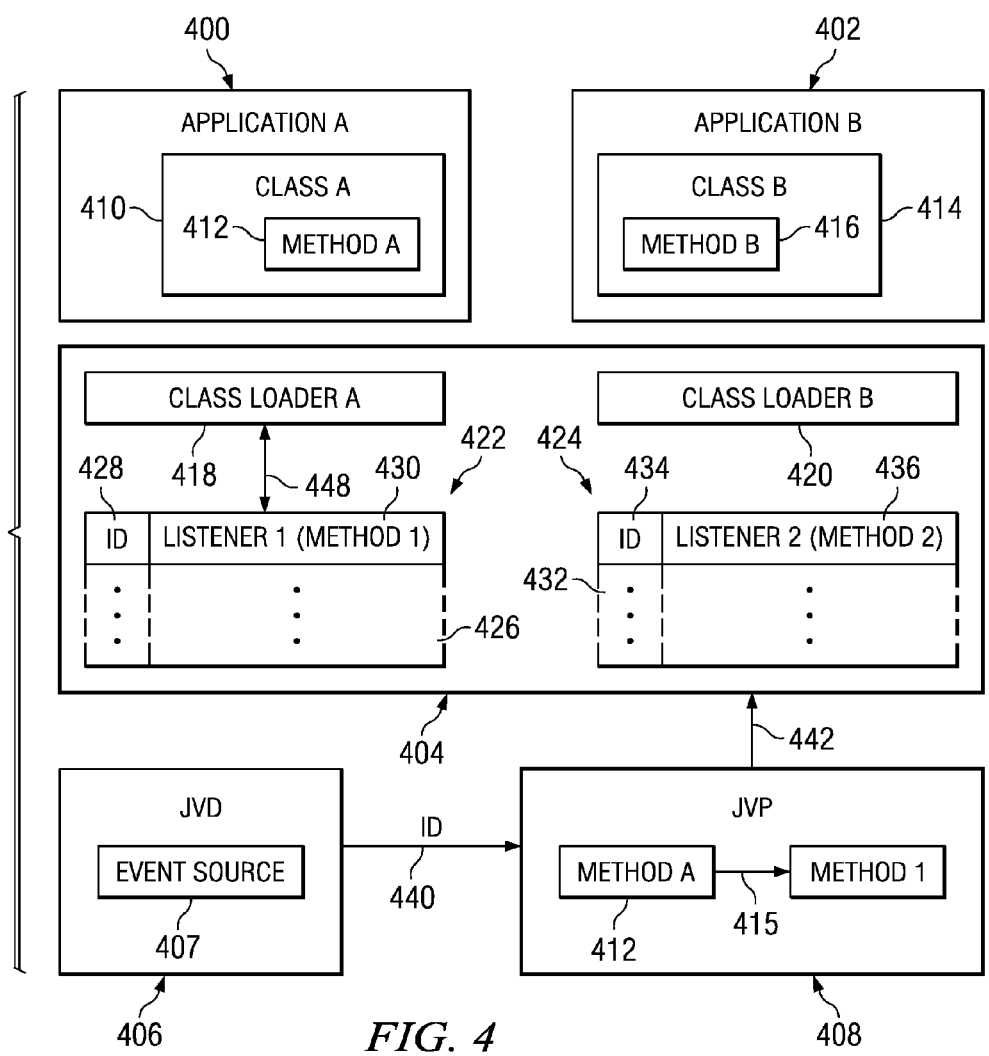
FIG. 4 illustrates a first method of invoking a Java method in response to a notification in accordance with embodiments of the invention.

FIG. 4 illustrates embodiments of the present invention for identification and execution of the proper Java method in response to the notification that has been raised based on the occurrence of an event. In particular, FIG. 4 shows an application 400, an application 402, a Java platform 404 which comprises the resource manager 120 (FIG. 1) and a Java API Configuration, a Java Virtual Device (JVD) 406, and a Java Virtual Processor (JVP) 408 which comprises the JEK 116 (FIG. 1) and the JSM 102 (FIG. 1). Application 400 has a corresponding class loader 418 that loads class 410, and application 402 has a corresponding class loader 420 that loads class 414. Applications 400 and 402, as well as class loaders 418 and 420, are exemplary, and other additional applications (not shown) may correspond to other additional class loaders (not shown), wherein the other class loaders may be executed on the Java platform 404. In addition, classes 410 and 414 are exemplary, and applications 400 and 402 may comprise other additional classes that are not shown. The class loaders are part of the Java API Configuration of the Java platform 404, and the class loaders are responsible for loading classes at runtime. The classes are loaded into a section of the memory 106 (FIG. 1) that is accessible to the JVP 408 during application execution. Classes may define attributes and behaviors. Behaviors are referred to as methods, and classes may comprise one or more methods that define all the behaviors available within a given class. For example, methods may request the performing of some action such as setting a value, returning a value, or writing to a file. As shown in FIG. 4, class 410 comprises method 412, and class 414 comprises method 416. Methods 414 and 416 are exemplary, and classes 410 and 414 may comprise additional methods that are not shown. When a particular application is executing, one of its corresponding methods is accessed and executed by the JVP 408. In the example of FIG. 4, application 400 is executing as evidenced by method 412 being executed within the JVP 408.

In some embodiments, hardware or software components may be virtualized by way of the JVD 406 that is coupled to the JVP 408. When an event occurs (e.g., clicking the mouse button), the JVD 406 communicates the occurrence of the event to the JVP 408, as indicated by arrow 440, and the JVP 408 may raise a notification if there is a registered listener (i.e., a registered event handler). A registered listener is a Java object that handles events generated by event sources. Only registered listeners may receive notifications from the JVP 408 regarding events generated by the event sources. When a registered listener receives a notification, a particular Java method is triggered for execution (i.e. invoked). In embodiments of the present invention, a class loader (e.g., class loader 418 or class loader 420) assists in identifying the proper listener that is to receive an incoming notification, and thus further assists in identifying the proper Java method that is to be triggered based on the notification. In addition, the particular Java method that is triggered depends on the method executing within the JVP 408 at the time the event is generated. In some embodiments, the class loaders are designed to manage a plurality of notifications. In yet other embodiments, the class loaders are responsible for determining which notifications to support. In still other embodiments, each notification comprises a priority value assigned by the JEK 116 (FIG. 1), and any particular notification can only be pre-empted by a higher priority notification.

The class loaders assist in identifying the proper method to invoke based on the received notification. To accomplish this task, in some embodiments, a table 422 is bound (i.e., associated) to the class loader 418, and a table 424 is bound (i.e., associated) to the class loader 420. As discussed above, the illustrations of FIGS. 4 and 5 are exemplary, and there may be more than two applications, class loaders, classes, or methods. In particular, in some embodiments, each of the plurality of class loaders (e.g., class loaders 418 and 420) may be bound to a plurality of tables. The tables may be implemented within the Java platform 404, as separate logic in the JSM 102 (FIG. 1), or as software within the JEK 116 (FIG. 1). The table 422 comprises a plurality of entries 426, and the table 424 comprises a plurality of entries 432. The entries 426 and 432 may comprise one entry for each registered listener. For example, if there are a total of 10 registered listeners, the tables 422 and 424 each comprise at least 10 entries. In some embodiments, each table may comprise a distinct number of entries which may correspond to each class loader (e.g., class loaders 418 and 420) supporting a different number of notifications. In some embodiments, each entry 426 comprises at least two fields—a notification identifier field 428 and a listener field 430. Likewise, each entry 432 comprises at least two fields—a notification identifier field 434 and a listener field 436. Fields 428 and 434 comprise a notification identifier value corresponding to a unique event identification (id) 440 that is generated by an event source 407 indicating that an event has occurred (e.g., a mouse button has been clicked). The listener fields 430 and 436 contain references to registered listeners that are associated with the notification identifier values stored in fields 428 and 434, respectively. When a notification is raised, a class loader identifies a registered listener associated with a notification identifier value within a table having a value equal to the event id 440, and an appropriate method (associated with the identified registered listener) is invoked. In other embodiments, each entry 426 comprises at least the listener field 430 and an index value. Likewise, each entry 432 comprises at least the listener field 436 and an index value. When a notification is raised, a class loader may identify a registered listener based on the index value and invoke the appropriate method. In some exemplary embodiments, the index value may equal the notification identifier value. In embodiments of the present invention, the invoked method is dependent on the method executing within the JVP 408 when the event is generated. In some exemplary embodiments, the JEK 116 may dynamically overwrite associations stored in the tables with new associations, thus allowing any available method to be invoked by any notification identifier value (and thus by any event id 440) that is encountered.

Consider again the example as shown in FIG. 4, and consider that an event occurs (e.g., a mouse button has been clicked). An event source 407 generates an event comprising a unique event identification (id) as indicated by arrow 440, and the event id 440 is passed to the JVP 408. Upon receiving the event id 440, the JEK of the JVP 408 identifies the method currently executing on the JVP 408, and the JEK determines if there are any listeners registered to be notified of the occurrence of the event signified by the event id 440 just received by the JVP 408. In the example of FIG. 4, method 412 (corresponding to application 400) is identified as the method executing upon receipt of the event id 440. For the purposes of this disclosure, there is a negligible time lag between event generation and receipt of the event id 440 by the JVP 408. A CPU object within the JEK (for virtualizing the JSM) then raises a Java notification 442. Based on the raised notification, the JEK finds the class loader 418 within the Java platform 404 that loaded the class 410 which corresponds to the method 412 that was running within the JVP 408 at the time the event id 440 was received from the event source 407 of the JVD 406. The class loader 418 receives the notification, which comprises the event id 440, and thereby identifies the registered listener (Listener 1 within listener field 430) associated with the event id 440 (by way of the notification identifier field 428) within the table 422 as indicated by arrow 448. Thereafter, the appropriate method (Method 1) associated with the identified registered listener (Listener 1) is invoked as indicated by arrow 415, and the notification expires.

Figure 5:
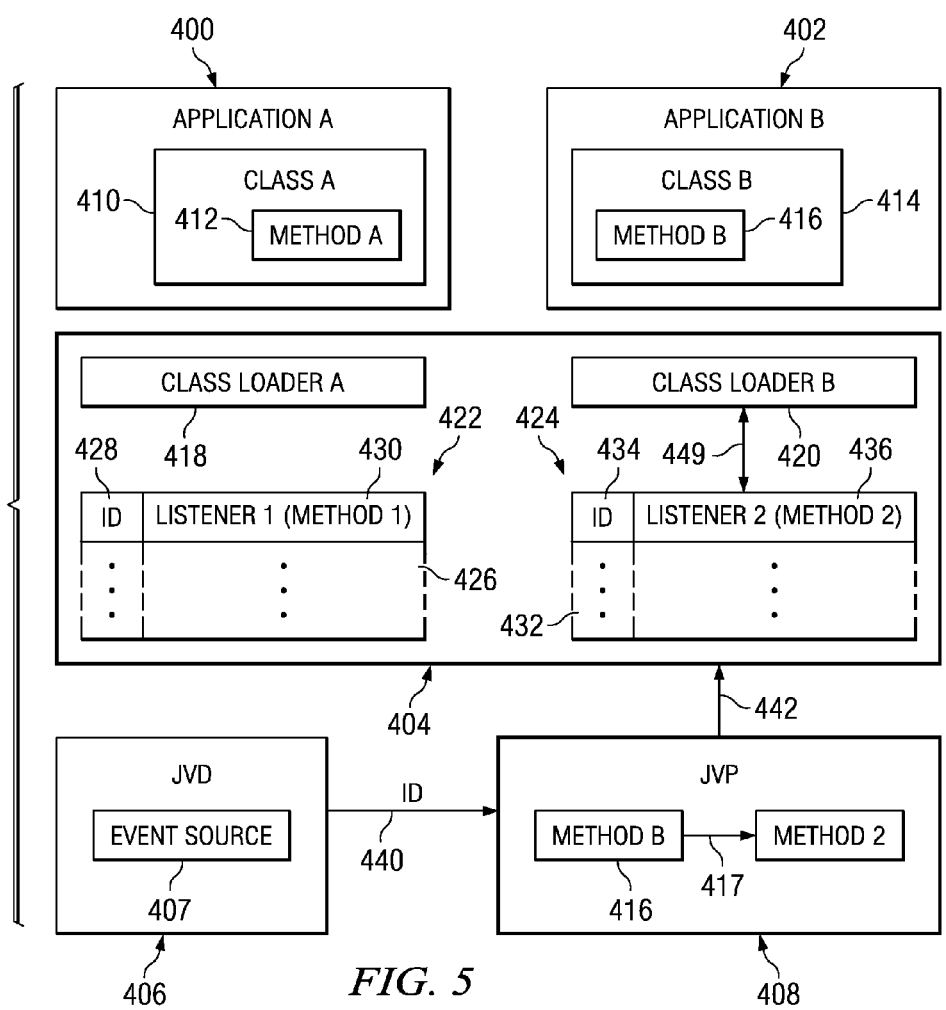
FIG. 5 illustrates a second method of invoking a Java method in response to a notification in accordance with embodiments of the invention.

FIG. 5 illustrates embodiments of the present invention similar to FIG. 4. However, in the example as shown in FIG. 5, the event is generated while application 402 is executing as evidenced by method 416 being executed within the JVP 408. Again consider that an event occurs (e.g., a mouse button has been clicked). An event source 407 generates an event comprising a unique event id as indicated by arrow 440, and the event id 440 is passed to the JVP 408. Upon receiving the event id 440, the JEK of the JVP 408 identifies the method currently executing on the JVP 408, and the JEK determines if there are any listeners registered to be notified of the occurrence of the event signified by the event id 440 just received by the JVP 408. In the example of FIG. 5, method 416 (corresponding to application 402) is identified as the method executing upon receipt of the event id 440. A CPU object within the JEK then raises a Java notification 442. Based on the raised notification, the JEK finds the class loader 420 within the Java platform 404 that loaded the class 414 which corresponds to the method 416 that was running within the JVP 408 at the time the event id 440 was received from the event source 407 of the JVD 406. The class loader 420 receives the notification, which comprises the event id 440, and thereby identifies the registered listener (Listener 2 within listener field 436) associated with the event id 440 (by way of the notification identifier field 434) within the table 424 as indicated by arrow 449. Thereafter, the appropriate method (Method 2) associated with the identified registered listener (Listener 2) is invoked as indicated by arrow 417, and the notification expires. Considering the examples of FIGS. 4 and 5 together, the same event generated by the event source 407 having the unique event id 440 may in turn trigger (i.e., invoke) one of two methods (Method 1 or Method 2) based on the method executing within the JVP 408 at the time the event id 440 is received from the event source 407 of the JVD 406. In some embodiments, the event generated by the event source 407 may in turn trigger a plurality of methods. For instance, in some embodiments, a plurality of class loaders within the Java platform 404 may each be bound to a plurality of tables, wherein each of the plurality of tables may comprise at least one registered listener configured to receive the notification.

Figure 6:
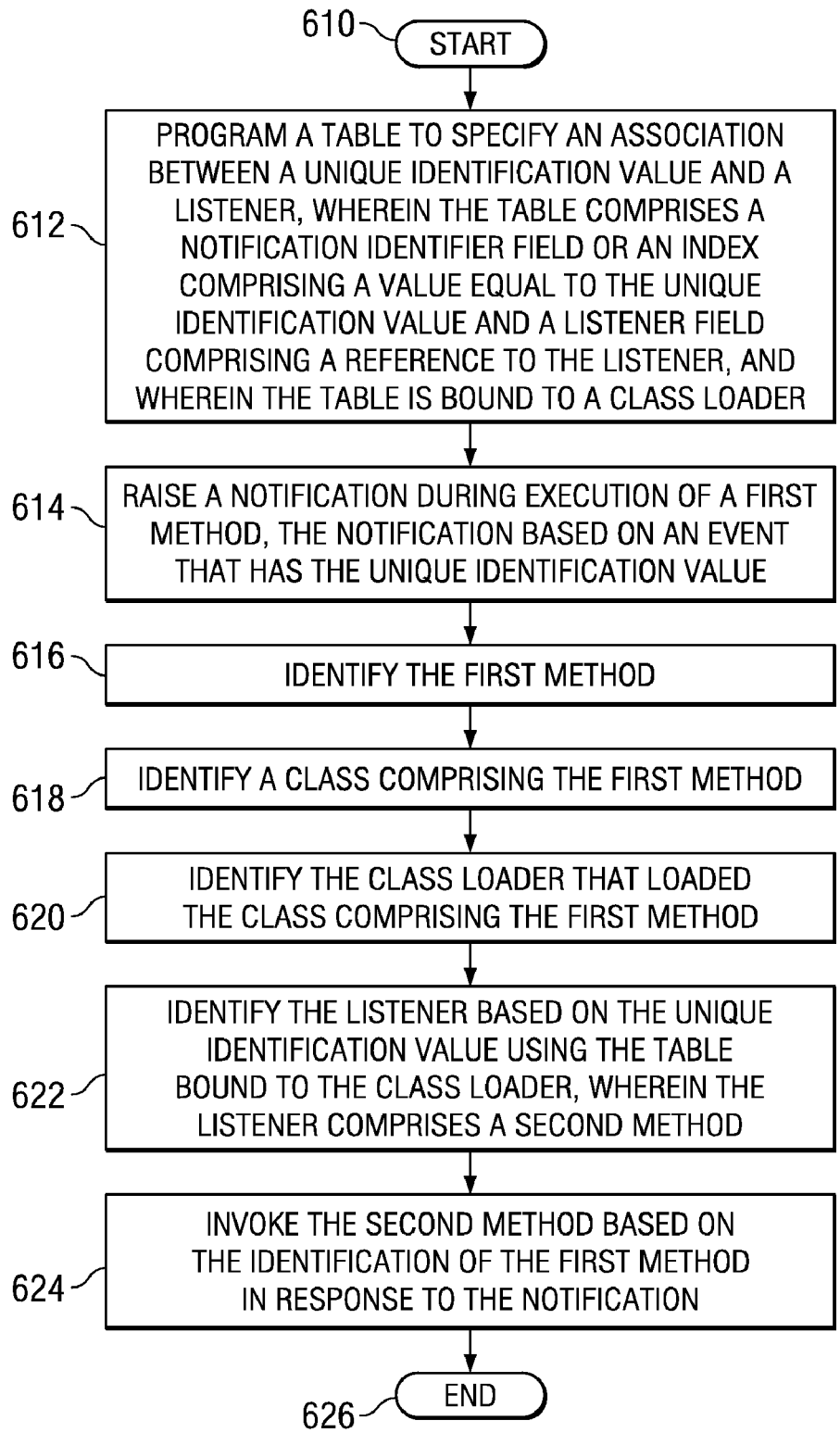
FIG. 6 illustrates a first method in accordance with embodiments of the invention.

FIG. 6 illustrates a method (e.g., software) in accordance with some embodiments. In particular, the process starts (block 610) and proceeds to programming a table (block 612). The table specifies an association between an identification value and a listener (i.e., an event handler). The table has a notification identifier field or an index that comprises a value equal to the identification value, and a listener field comprising a reference to the listener. In some embodiments, the table is bound to a class loader. In other embodiments, the class loader may be bound to a plurality of tables. Afterwards, a notification is raised during the execution of a first Java method (block 614). The notification is based on an event that has the identification value. Further, the first Java method may comprise any of a plurality of Java methods that may be executed on the JVP 408. In some embodiments, the identification value may be unique to the event. The first Java method is then identified (block 616). The process then proceeds to identifying a Java class comprising the first Java method (block 618). The Java class may comprise any of a plurality of Java classes that comprise an application (e.g., applications 400 Or 402 of FIGS. 4 and 5). A Java class loader that loaded the Java class is then identified (block 620). The Java class loader may comprise any of a plurality of Java class loaders that may execute within the Java platform 404 (FIGS. 4 and 5). The listener is next identified based on the identification value (block 622) by using the association that was specified in the table bound to the Java class loader, wherein the listener comprises a second Java method. In some embodiments, the listener may comprise any of a plurality of Java methods. The second Java method is then invoked based on the identification of the first Java method and in response to the notification (block 624). Thus, one of a plurality of Java methods is invoked based on the Java method executing when the notification is raised. The process then ends (block 626).

Figure 7:
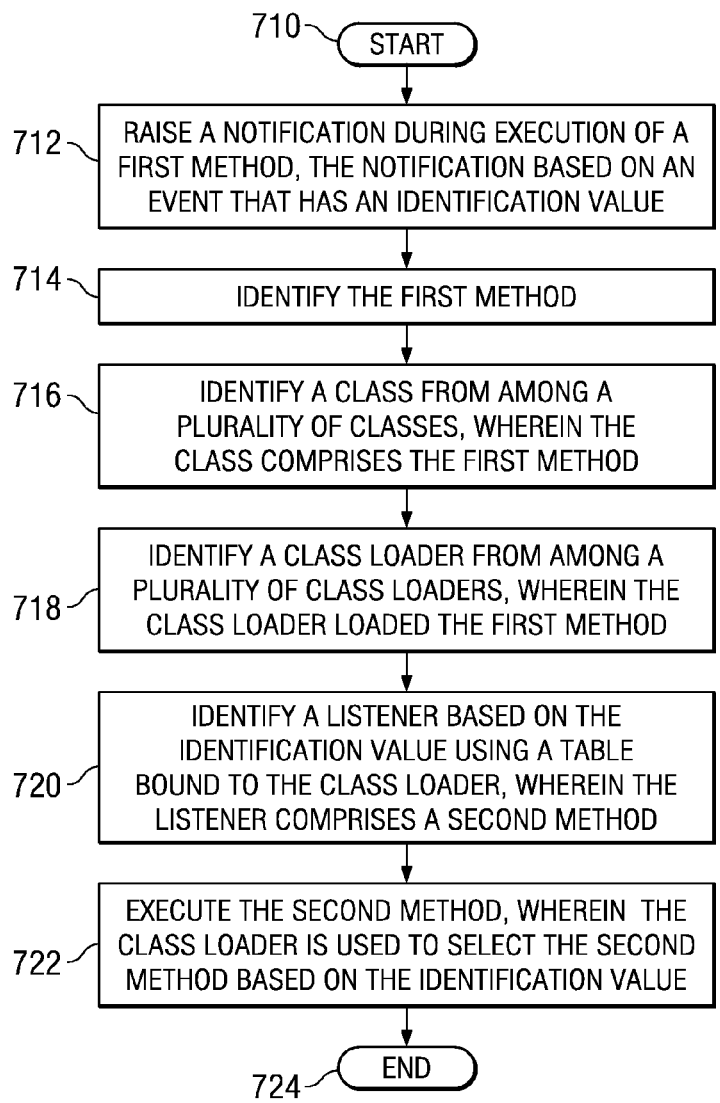
FIG. 7 illustrates a second method in accordance with embodiments of the invention.

FIG. 7 illustrates a method (e.g., software) in accordance with some alternative embodiments. In particular, the process starts (block 710) and proceeds to raising a notification during the execution of a first Java method (block 712). The first Java method is then identified (block 714). The process then proceeds to identifying a Java class from among a plurality of Java classes (block 716). The Java class comprises the first Java method. A Java class loader that loaded the Java class is then identified from among a plurality of class loaders (block 718). A listener is next identified based on the identification value (block 720) using a table bound to the Java class loader, and the listener comprises a second Java method. The second Java method is then executed (block 722). The Java class loader is used to select the second Java method based on the identification value. Thus, a second Java method is executed based on the identity of a first Java method executing when the notification is raised. The process then ends (block 724).

Figure 8:
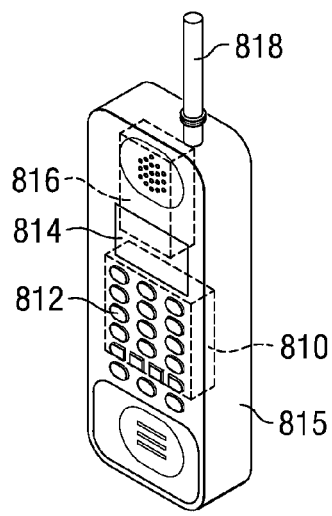
FIG. 8 illustrates a system in accordance with at least some embodiments of the invention.

System 100 (FIG. 1) may be implemented as a mobile cell phone such as that shown in FIG. 8. As shown, the mobile communication device has an outer enclosure 815 and includes an integrated keypad 812 and display 814. The JSM processor 102 and MPU processor 104 and other components may be included in electronics package 810 connected to the keypad 812, display 814, and radio frequency ("RF") circuitry 816. The RF circuitry 816 may be connected to an antenna 818.

From the description provided herein, those skilled in the art are readily able to combine software created as described with appropriate general purpose or a special purpose computer hardware to create a computer system and/or computer subcomponents embodying aspects of the invention, to create a computer system and/or computer subcomponents for carrying out the method embodiments of the invention, and/or to create a computer-readable medium storing a software program to implement method aspects of the various embodiments. Moreover, the embodiments of the illustrative methods could be implemented together in a single program (with various subroutines), or split up into two or more programs executed on the processor.

While various embodiments of the invention have been shown and described, modifications thereof can be made by one skilled in the art without departing from the spirit and teachings of the invention. The embodiments described herein are illustrative only, and are not intended to be limiting. Numerous variations and modifications will become apparent to those skilled in the art once the above disclosure is fully appreciated. It is intended that the following claims be interpreted to embrace all such variations and modifications.

What is claimed is:

1. A method comprising:
receiving a notification during execution of a first method for a class loaded by a first class loader application, wherein the notification comprises an event identifier;
identifying a listener program registered with first class loader application for the event identifier;
invoking a second method associated with the listener program in response to said identifying, wherein the second method is loaded by a second class loader application; and
programming a table to specify an association between the event identifier and the listener program.

2. The method according to claim 1 further comprising identifying the class comprising the first method.

3. The method according to claim 1 further comprising identifying the first class loader application that loaded the class comprising the first method.

4. The method according to claim 1, wherein the registered listener program is a Java object configured to handle the notification.

5. The method according to claim 1 wherein the programming further comprises programming the table, the table comprising a notification identifier field and a listener program field, wherein the notification identifier field comprises a value equal to a unique identification value corresponding to the event identifier, and wherein the listener program field comprises a reference to the listener program.

6. The method according to claim 1 wherein the programming further comprises programming the table, the table comprising a listener program field and an index value, wherein the index value is equal to a unique identification value corresponding to the event identifier, and wherein the listener program field comprises a reference to the listener program.

7. A computer system comprising:
a processor that executes bytecodes; and
a memory coupled to the processor;
wherein the processor raises a notification during execution of a first method for a class loaded by a first class loader, the notification based on an event that has an identification value;
wherein the processor identifies the first class loader from among a plurality of class loaders;
wherein the processor identifies a listener program registered with the first class loader for the identification value;

wherein the processor executes a second method associated with the listener program, wherein the second method is loaded by a second class loader and wherein the processor programs a table that specifies an association between the identification value and the listener program.

8. The computer system according to claim 7 wherein the processor identifies the class from among a plurality of classes, wherein the class comprises the first method.

9. The computer system according to claim 7 wherein the processor identifies the first method.

10. The computer system according to claim 7 wherein the registered listener program is a Java object configured to handle the notification.

11. The computer system according to claim 7 wherein the table comprises a notification identifier field and a listener program field, wherein the notification identifier field comprises a value equal to the identification value, and wherein the listener program field comprises a reference to the listener program.

12. The computer system according to claim 7 wherein the table comprises a listener program field and an index value, wherein the index value is equal to the unique identification value, and wherein the listener program field comprises a reference to the listener program.

13. A non-transitory computer-readable medium storing a program that, when executed by a processor of a host system, causes the processor to:

raise a notification during execution of a first method for a class loaded by a first class loader, the notification based on an event that has an identification value;

identify a listener program registered with the first class loader for the identification value;

execute a second method associated with the listener program in response to the identification, wherein the second method is loaded by a second class loader and program a table that specifies an association between the identification value and the listener program.

14. The non-transitory computer-readable medium according to claim 13 further causing the processor to identify the class comprising the first method.

15. The non-transitory computer-readable medium according to claim 13 further causing the processor to identify the first class loader.

16. The non-transitory computer-readable medium according to claim 13 wherein the registered listener program is a Java object configured to handle the notification.

17. The non-transitory computer-readable medium according to claim 13 further causing the processor to identify the class from among a plurality of classes.

18. The non-transitory computer-readable medium according to claim 13 further causing the processor to identify the first class loader from among a plurality of class loaders.

* * * * *